July 1, 1969  J. H. SWARBRICK  3,452,996
GRIPPING MEANS FOR A MACHINE TOOL
Filed May 20, 1966
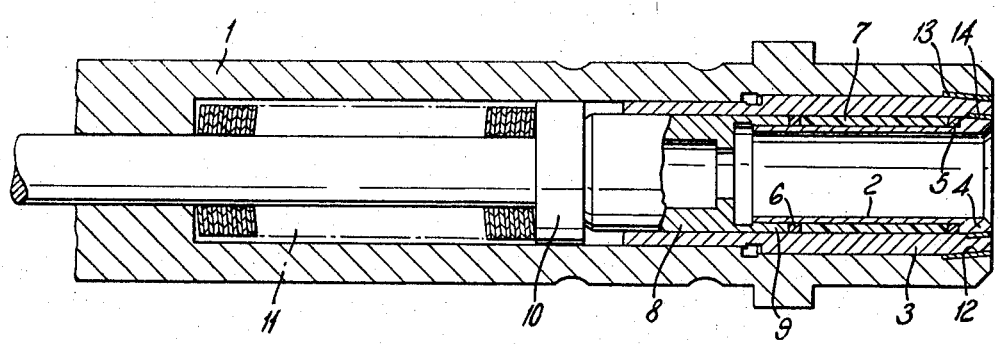
Inventor
Justin Henry Swarbrick
Watson, Cole, Grindle + Watson
Attorneys United States Patent Office 3,452,996
Patented July 1, 1969

3,452,996
GRIPPING MEANS FOR A MACHINE TOOL
Justin Henry Swarbrick, London, England, assignor to Molins Machine Company Limited, London, England, a corporation of Great Britain
Filed May 20, 1966, Ser. No. 551,724
Claims priority, application Great Britain, May 25, 1965, 22,003/65
Int. Cl. B23b *31/30, 31/10, 5/22*
U.S. Cl. 279—4                                   5 Claims

ABSTRACT OF THE DISCLOSURE

A holder for gripping a rod-like article in a machine tool is disclosed, the holder comprising a deformable sleeve in which the rod-like article is inserted and an annular chamber surrounding the sleeve containing a fluid medium having plastic characteristics when a steady force is applied to it and solid characteristics when acted on by a shock force. Pressure applied to the fluid medium causes the deformable sleeve to grip the rod-like article and vibrations generated by high-speed metal cutting causes the fluid medium to become solid enabling the cutting head to retain its stiffness.

---

This invention concerns improvements relating to means in a machine tool for holding and gripping the shank of a cutting tool or a cylindrically shaped part of a workpiece or another similarly formed rod-like article.

Particularly in numerically controlled machine tools it has been found necessary to use chucks or toolholders having properties not usually found in those associated with the older type manually operated ones. For instance, a common feature in such machine tools is the ability of the chuck to open, to have inserted therein the shank of a particular tool from a tool store and then to close so as to grip that shank. This necessitates the removal of all means for hand tightening and the introduction of moving parts that can automatically open and close the chuck on the receipt of instructions from a tape or other means of conveying them. Then again the requirements of stiffness in eliminating unwanted tool or workpiece movement have to be combined with the desirability for having a slim holder so that workpiece and tool have maximum freedom of relative movement. A further requirement is that more exact axial location of the tool within the holder has become a necessity so that the accuracy of machining operations may be intensified. Tool chatter or vibration should also be eliminated as far as it is possible to do so, in order that the quality of surface finish may be improved.

The present invention has all these desirable objectives in mind and sets out to provide an improved means of providing them.

According to the invention there is provided in a machine tool a holder for gripping a rod-like article comprising a deformable sleeve within which the rod-like article can be inserted, means defining an enclosed annular space around the sleeve, a fluid medium filling said space and pressure means adapted to act in an axial direction on the fluid medium so as to cause said sleeve to deform.

As used hereinbefore and hereafter the term "axial" is to be taken as referring to the axis of the rod-like article held in the tool holder and the term "forward" is to be understood as referring to the axial direction away from the tool holder and towards the free end of the rod-like article.

Apparatus in accordance with the invention will now be described by way of example with reference to the accompanying drawing which shows a section through part of a tool holder or chuck suitable for use in a numerically controlled machine tool.

Reference numeral 1 indicates a barrel of the cutter head of a machine tool similar to that as disclosed in U.S. Patent No. Re. 25,956, issued Feb. 22, 1966, to David T. N. Williamson. The barrel 1 is rotatable within the cutter head and is driven by known means. An inner sleeve 2 is separated from the barrel 1 by a further sleeve 3. The inner sleeve 2 is provided at its forward end with a flange 4 against which abuts a sealing ring 5. A second sealing ring 6 surrounds the sleeve 2 at a position towards its rear end. The further sleeve 3 together with the inner sleeve 2 and the sealing rings 5 and 6 define an annular space 7 which is filled with silicone putty. Bearing against the sealing ring 6 is pressure means, in this case a piston 8 having an annular extension 9. Abutting the rear face of the piston 8 is a plunger 10 operated by Belleville washers 11 to urge the former in a forward direction. The plunger 10 is retracted by mechanism which is not shown and which could be similar to that disclosed in the aforementioned application.

The further sleeve 3 is prevented from forward movement by having its forward outside diameter chamfered at 12 to mate with a corresponding chamfer in the forward bore of the barrel 1. For ease of assembly a split ring 13 separates the two chamfers. A similar construction with a further split ring 14 prevents the inner sleeve 2 from all forward movement relatively to the further sleeve 3.

The apparatus operates as follows. To open the chuck the plunger 10 is moved in a backwards direction, i.e. to the left as seen when looking at the drawing. With the plunger 10 withdrawn the inner sleeve 2 expands to its normal dimension and allows the shank of a cutting tool to be inserted therein. To close the chuck the plunger 10 is allowed to move forwards under the action of the Belleville washers 11. The washers 11 exert a forward thrust of approximately 1200 lbs. This thrust is transmitted via the sealing ring 6 to the silicone putty in the annular space 7. Silicone putty is an elastoviscous fluid material having the property of being plastic and therefore of being able to flow when acted on by a force leading to a slow rate of deformation and of being brittle or solid when acted on by a shock force leading to a high rate of deformation. The forward thrust of 1200 lbs. leads to slow deformation and the silicone putty is, therefore, in a flowable state. The pressure of the putty increases due to the narrow width of the annular space 7 to a figure of approximately 6,000 p.s.i. This results in a radial contraction of the sleeve 2 which therefore firmly grips the shank of the tool.

Once the tool is firmly gripped in the sleeve 2 and starts cutting the advantage resulting from the second property of the silicone putty can be seen. High speed metal cutting results in juddering or high frequency vibration due to impact of cutting edges with the metal and to other reasons. These high frequency shock forces are transmitted to the silicone putty through the sleeve and cause it to become solid. Thus the silicone putty resists the vibrational forces and enables the cutting head to retain its stiffness.

What I claim as my invention and desire to secure by Letters Patent is:

1. In a machine tool a holder for gripping a rod-like article comprising a deformable sleeve within which the rod-like article can be inserted, means defining an enclosed annular space around the sleeve, an elastoviscous fluid medium filling said space, said fluid medium having the property of being plastic when acted on by a steady force and of being solid when acted on by a shock force, and pressure means adapted to act on the fluid medium so as to cause said sleeve to deform.

2. A holder as claimed in claim 1 wherein said material is silicone putty.

3. A holder as claimed in claim 1 further comprising means to restrain said sleeve from forward axial movement relative to the holder.

4. A holder as claimed in claim 1 wherein said means defining an enclosed annular space comprise said sleeve, a further outer sleeve and two spaced sealing members in fluid-tight contact with the exterior of said sleeve and the interior of said outer sleeve.

5. A holder as claimed in claim 1 wherein said pressure means is adapted to act on the fluid medium in an axial direction.

References Cited

UNITED STATES PATENTS

| | | | |
|---|---|---|---|
| 2,541,851 | 2/1951 | Wright | 260—448.2 |
| 2,431,878 | 12/1947 | McGregor | 260—448.2 |
| 2,744,756 | 5/1956 | Atherholt | 279—2 |
| 3,072,416 | 1/1963 | Leifer | 279—4 |
| 3,250,542 | 5/1966 | Winnen. | |

FOREIGN PATENTS

| | | |
|---|---|---|
| 745,845 | 5/1944 | Germany. |
| 1,008,545 | 5/1957 | Germany. |

OTHER REFERENCES

Silicones, R. N. Meals and F. M. Lewis, Reinhold Publishing Co., New York, 1969, pp. 87 and 227.

ROBERT C. RIORDON, *Primary Examiner.*

D. R. MELTON, *Assistant Examiner.*